United States Patent Office 3,320,329
Patented May 16, 1967

3,320,329
OXIDATIVE DEHYDROGENATION OVER STANNIC PHOSPHATE CATALYST
George J. Nolan, Bartlesville, Okla., assignor to Phillips Petroleum Company, a corporation of Delaware
No Drawing. Filed Apr. 23, 1965, Ser. No. 450,508
10 Claims. (Cl. 260—680)

This invention relates to a method for dehydrogenating hydrocarbons.

This invention also relates to a new dehydrogenation catalyst.

Heretofore, in the dehydrogenation of hydrocarbons such as olefins, low conversions have been necessary in order to obtain a reasonably high selectivity for a desired product. Also, heretofore, steam has been utilized and was considered desirable as a diluent for the hydrocarbon feed to assist in obtaining higher conversion and selectivity.

It has now been found that compounds selected from the group consisting of alkenes, cycloalkenes, alkylpyridines and alkyl aromatics can be dehydrogenated at relatively high conversion and selectivity rates and without the use of steam if the compound is passed in the presence of oxygen over a tin phosphate catalyst. The alkenes contain from 3 to 10, preferably from 4 to 6, carbon atoms per molecule, inclusive, and the cycloalkenes contain from 4 to 10, preferably from 4 to 6, carbon atoms per molecule, inclusive. The alkylpyridines and alkyl aromatics contain from 1 to 4, preferably from 1 to 2, alkyl groups per molecule which contain from 1 to 6, preferably 4 to 6, carbon atoms per group, inclusive with at least one alkyl group having at least 2 carbon atoms.

Also, according to this invention, tin phosphate, preferably stannic phosphate, is employed as a novel dehydrogenation catalyst.

Accordingly, it is an object of this invention to provide a new and improved method for dehydrogenating a hydrocarbon.

It is another object of this invention to provide a new catalyst for dehydrogenating a hydrocarbon.

Other aspects, objects and the several advantages of the invention will be apparent to those skilled in the art from the description and the appended claims.

According to this invention, alkenes such as propylene, n-butene, n-pentene, isopentenes, the octenes, the decenes, and the like can be dehydrogenated. Also, both alkylsubstituted and unsubstituted cycloalkenes such as cyclobutene, cyclopentene, cyclohexene, 3-butylcyclohexene, 3-isopentylcyclopentene, and the like can be employed. Similarly, this invention applies to the dehydrogenation of monocyclic aromatics such as ethylbenzene, propylbenzene, n-butyl benzene, isobutyl benzene, hexylbenzene, 1-methyl-2-propylbenzene, 1-butyl-3-hexylbenzene, and the like. Also, the process of this invention applies to the dehydrogenation of ethylpyridine, 2-methyl-5 - ethylpyridine, 2,3,4 - trimethyl - 5 - ethylpyridine, 2-ethyl-5-hexylpyridine, and the like. Preferred reactions according to this invention are the formation of 1,3-butadiene from butenes, 1,3-pentadiene from pentenes, isoprene from the 2-methylbutenes, styrene from ethylbenzene, and 2-methyl-5-vinylpyridine from 2-methyl-5-ethylpyridine.

The tin phosphate catalyst of this invention is preferably employed in the form of stannic phosphate and can be used in the form of granules, mechanically-formed pellets, and the like. The catalyst can also be employed with suitable supporting or diluting materials such as alumina (preferably eta or gamma or mixtures thereof), boria, beryllia, magnesia, titania, zirconia, or other similar materials.

The term "stannic phosphate" as employed in this invention is intended to include the compound $Sn_3(PO_4)_4$ as well as mixtures of oxides, e.g., $2SnO_2 \cdot P_2O_5$. The term also is meant to include oxygen-containing compounds of tin and phosphorus in which the tin has an apparent valence of 4 and the phosphorous has an apparent valence of 5.

The catalyst can be prepared by any conventional means such as bringing the catalyst components together in a mill, such as a hammer mill, and milled to a small size, the milled mixture being pelleted and dried to form the final catalyst. Alternately, the catalyst components can be formed into a paste with any suitable liquid such as water and extruded into the desired shape and size. Other methods include dry milling, impregnation and other known methods.

The amount of catalyst employed will vary widely depending upon the materials present and the conversion and selectivity desired, a primary requirement being that for each reaction an effective catalytic amount is employed. The oxygen can be employed as such or with an inert diluent such as nitrogen and the like. Desirable oxygen-containing gases include air, flue gases containing a residual oxygen, and the like.

The operating conditions for this invention can vary widely but will generally include a temperature from about 700 to about 1300, preferably from about 800 to about 1200° F., a pressure from about 0.05 to about 50, preferably from about 0.1 to about 25, p.s.i.a., and an oxygen to hydrocarbon volume ratio of from about 0.1/1 to about 3/1, preferably from about 0.5/1 to about 2/1. The hydrocarbon space rate (volumes hydrocarbon vapor/volume of catalyst/hour, 32° F., 15 p.s.i.a.) can be from about 50 to about 5000, preferably from about 100 to about 2500, still more preferably from about 200 to about 1000.

The presence of oxygen during the dehydrogenation reaction permits extended operating periods but when catalyst regeneration is necessary, such can be effected simply by terminating the hydrocarbon flow for a sufficient length of time while continuing the flow of oxygen-containing gas at the same or higher rate as desired. The dehydrogenation process is resumed simply by restarting the hydrocarbon flow.

The process of this invention is ordinarily carried out by forming a mixture, preferably preheated, of the compound to be dehydrogenated and oxygen or oxygen-containing stream and passing this mixture over the catalyst at the desired temperature. Recycle of unconverted compound can be employed if desired; however, the conversion rates and selectivity of this invention are generally sufficiently high to justify a single step, i.e., single pass, operation, if, for example, the product streams can be used without separation steps in a subsequent operation, such as polymerization.

Example

Stannic phosphate (about 97.5 wt. percent $2SnO_2 \cdot P_2O_5$) in the form of 10–20 mesh granules was used to dehydrogenate trans-butene-2 under the following conditions and with the indicated results:

TABLE

|  | Run No. | | | | |
| --- | --- | --- | --- | --- | --- |
|  | 1 | 2 | 3 | | |
| Temperature, F | 900 | 1,000 | 1,100 | 1,100 | 1,100 |
| Pressure, p.s.i.a | 15 | 15 | 15 | 15 | 15 |
| Olefin space rate, v./v./hr.[1] | 600 | 700 | 700 | 700 | 400 |
| Total space rate, v./v./hr.[2] | 3,600 | 4,200 | 4,200 | 4,200 | 4,200 |
| $O_2$[3]/olefin ratio, vol | 1/1 | 1/1 | 1/1 | 1/1 | 1.9/1 [4] |
| Time in run, min | 5 | 5 | 5 | 21 | 124 |
| Olefin conversion, mol percent | 39.3 | 67.6 | 76.6 | 46.3 | 69.7 |
| Butadiene yield: | | | | | |
| Per-pass | 36.3 | 62.1 | 69.6 | 37.3 | 48.5 |
| Ultimate | 92.4 | 91.9 | 90.8 | 80.6 | 69.5 |

[1] Vol. olefin vapor/vol. catalyst/hr., 32° F., 15 p.s.i.a.
[2] Vol. olefin and oxygen-containing vapor/vol. catalyst/hr., 32° F., 15 p.s.i.a.
[3] Present as air.
[4] Oxygen to olefin ratio changed at 119 minutes in run.

From the above data it can be seen that a substantial conversion to butadiene was effected in a single pass, thus indicating pronounced selectivity for that product.

Reasonable variations and modifications are possible within the scope of this disclosure without departing from the spirit and scope thereof.

I claim:

1. A method for dehydrogenating a compound selected from the group consisting of alkenes, cycloalkenes, alkylpyridines and alkyl aromatics comprising contacting said compound in the presence of oxygen with a catalyst consisting essentially of stannic phosphate.

2. A method for dehydrogenating a compound selected from the group consisting of alkenes containing from 3 to 10 carbon atoms per molecule, cycloalkenes containing from 4 to 10 carbon atoms per molecule, alkylpyridines containing from 1 to 4 alkyl groups per molecule wherein at least one group contains at least 2 carbon atoms, and monocyclic alkyl aromatics containing from 1 to 4 alkyl groups per molecule wherein at least one group contains at least 2 carbon atoms comprising contacting said compound in vaporous form and in the presence of an effective amount of oxygen with a catalyst consisting essentially of stannic phosphate.

3. The method according to claim 2 wherein the temperature is in the range of from 700 to about 1300° F. and the oxygen/compound ratio is in the range of from about 0.1/1 to about 3/1.

4. The method according to claim 2 wherein said catalyst is diluted with alumina.

5. A method for dehydrogenating alkenes containing from 4 to 5 carbon atoms per molecule comprising contacting said alkenes in vaporous form and in the presence of an effective amount of oxygen with a catalyst consisting essentially of stannic phosphate.

6. The method according to claim 5 wherein said contacting is carried out at a temperature in the range of from about 700 to about 1300° F. and the oxygen/alkene ratio is in the range of from about 0.1/1 to about 3/1.

7. A method for dehydrogenating butene comprising contacting vaporous butene with a catalyst consisting essentially of stannic phosphate at a temperature in the range of from about 800 to about 1200° F. and in the presence of a quantity of air sufficient to cause an oxygen/butene ratio in the range of from about 0.5/1 to about 2/1.

8. A method for dehydrogenating pentene comprising contacting vaporous pentene with a catalyst consisting essentially of stannic phosphate at a temperature in the range of from about 800 to about 1200° F. and in the presence of a quantity of air sufficient to cause an oxygen/pentene ratio in the range of from about 0.5/1 to about 2/1.

9. A method for dehydrogenating isopentene comprising contacting vaporous isopentene with a catalyst consisting essentially of stannic phosphate at a temperature in the range of from about 800 to about 1200° F. and in the presence of a quantity of air sufficient to cause an oxygen/isopentene ratio in the range of from about 0.5/1 to about 2/1.

10. A method for dehydrogenating trans-butene-2 comprising contacting vaporous trans-butene-2 with a catalyst consisting essentially of stannic phosphate at a temperature in the range of from about 800 to about 1200° F. and in the presence of a quantity of air sufficient to cause an oxygen/trans-butene-2 ratio in the range of from about 0.5/1 to about 2/1.

References Cited by the Examiner

FOREIGN PATENTS 933,149    8/1963    Great Britain.

DELBERT E. GANTZ, *Primary Examiner.*

G. E. SCHMITKONS, *Assistant Examiner.*